(12) United States Patent
Biswas et al.

(10) Patent No.: US 10,360,337 B2
(45) Date of Patent: Jul. 23, 2019

(54) METHOD OF FORMING CONDUCTIVE GRID OF INTEGRATED CIRCUIT

(71) Applicant: TAIWAN SEMICONDUCTOR MANUFACTURING COMPANY LTD., Hsinchu (TW)

(72) Inventors: Hiranmay Biswas, Kolkata (IN);
Kuo-Nan Yang, Hsinchu (TW);
Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 15/903,566

(22) Filed: Feb. 23, 2018

(65) Prior Publication Data

US 2019/0155981 A1 May 23, 2019

Related U.S. Application Data

(60) Provisional application No. 62/590,051, filed on Nov. 22, 2017.

(51) Int. Cl.
*G06F 17/50* (2006.01)
*G11C 11/00* (2006.01)
*H01L 29/76* (2006.01)
*H01L 27/02* (2006.01)

(52) U.S. Cl.
CPC ...... *G06F 17/5077* (2013.01); *H01L 27/0207* (2013.01); *G06F 2217/84* (2013.01)

(58) Field of Classification Search
None
See application file for complete search history.

(56) References Cited

U.S. PATENT DOCUMENTS

| | | | |
|---|---|---|---|
| 7,269,056 B1* | 9/2007 | Liaw | G11C 5/063 257/903 |
| 2012/0070977 A1* | 3/2012 | Schiwon | G03F 7/0035 438/637 |
| 2015/0161325 A1* | 6/2015 | Yang | G06F 17/5068 716/112 |
| 2016/0147926 A1* | 5/2016 | Chiang | H03K 19/02 716/122 |

* cited by examiner

*Primary Examiner* — Khaja Ahmad
(74) *Attorney, Agent, or Firm* — WPAT, P.C., Intellectual Property Attorneys; Anthony King (57) ABSTRACT

A method of forming an integrated circuit includes: forming a conductive grid on a semiconductor substrate; selecting a plurality of first conductive lines from a plurality of non-continuous conductive lines according to a first mask layer assigned to the plurality of first conductive lines; selecting a plurality of second conductive lines from the plurality of non-continuous conductive lines according to a second mask layer assigned to the plurality of second conductive lines, wherein the second mask layer different from the first mask layer, and the plurality of second conductive lines is electrically connected to the plurality of first conductive lines via the plurality of continuous conductive lines; and replacing the plurality of second conductive lines by a plurality of third conductive lines respectively, wherein the plurality of third conductive lines is assigned to the first mask layer.

20 Claims, 12 Drawing Sheets

FIG. 12

METHOD OF FORMING CONDUCTIVE GRID OF INTEGRATED CIRCUIT

CROSS-REFERENCE TO RELATED APPLICATION

This application claims the benefit of U.S. Provisional Application No. 62/590,051, filed Nov. 22, 2017.

BACKGROUND

The electric current used by various active semiconductor devices in a semiconductor chip are distributed through a set of electric interconnects or a power grid of the semiconductor chip. Therefore, the power grid is the power delivering structure in the semiconductor chip. A power grid may spread across different conductive levels, and may in general provide electric power or current to the various semiconductor devices using conductive wires, paths, pathways at different levels, and/or vias in crossing different levels. Currently, there are challenges to further improve the performance of the voltage (IR) drop, electro-migration (EM) performance, and routing resource of a power grid of a semiconductor chip.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Figure 1:
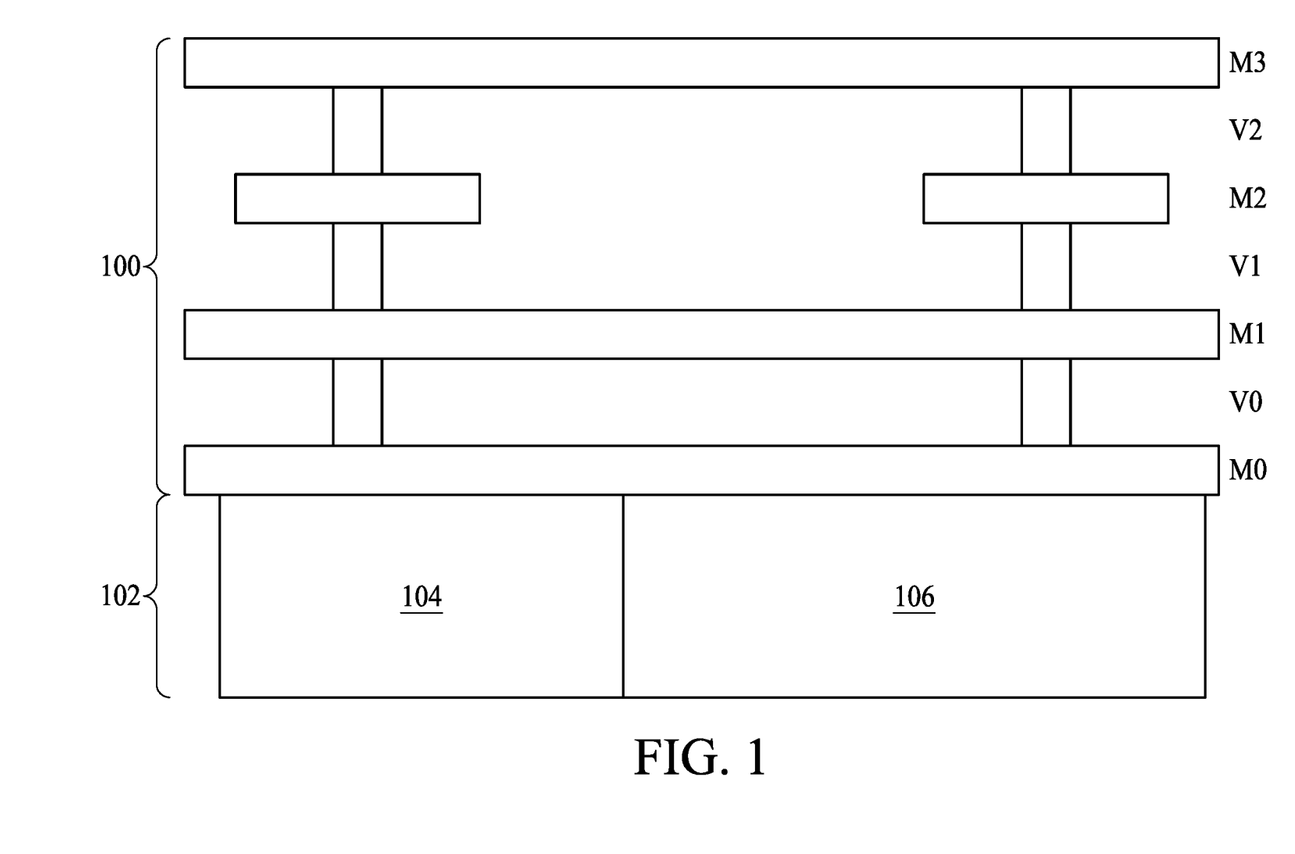
FIG. 1 is a cross-sectional diagram illustrating a power grid of an integrated circuit in accordance with some embodiments.

FIG. 1 is a cross-sectional diagram illustrating a power grid 100 of an integrated circuit 102 in accordance with some embodiments. The power grid 100 is a conductive grid arranged to deliver power from power source to a plurality of semiconductor cells (e.g. 104 and 106) in the integrated circuit 102. The power grid 100 is also arranged to conduct the plurality of semiconductor cells 104 and 106 to the ground voltage. The power grid 100 may be formed on back end of the line (BEOL) of the integrated circuit 102. According to some embodiments, the power grid 100 may comprise metal lines formed in the metal layers M0, M1, M2, M3, and via structures formed between the metal layers M0 and M1, the metal layers M1 and M2, and the metal layers M2 and M3. It is noted that the number of metal layers is just an example of the embodiment, and this is not a limitation of the embodiment. In addition, the metal lines and the via structures of the power grid 100 may be composed of various type of conductive material. For example, the conductive material may be selected from a group consisting of tungsten (W), aluminum (Al), copper (Cu), silver (Ag), gold (Au), titanium (Ti), tantalum (Ta), ruthenium (Ru), tungsten (W), titanium-nitride (TiN), tantalum-nitride (TaN), ruthenium nitride (RuN), and tungsten nitride (WN), and alloy thereof. The interlayers separated the metal layers M0, M1, M2, M3 are composed of insulating material. For example, the insulating material may be dielectric material.

Figure 2:
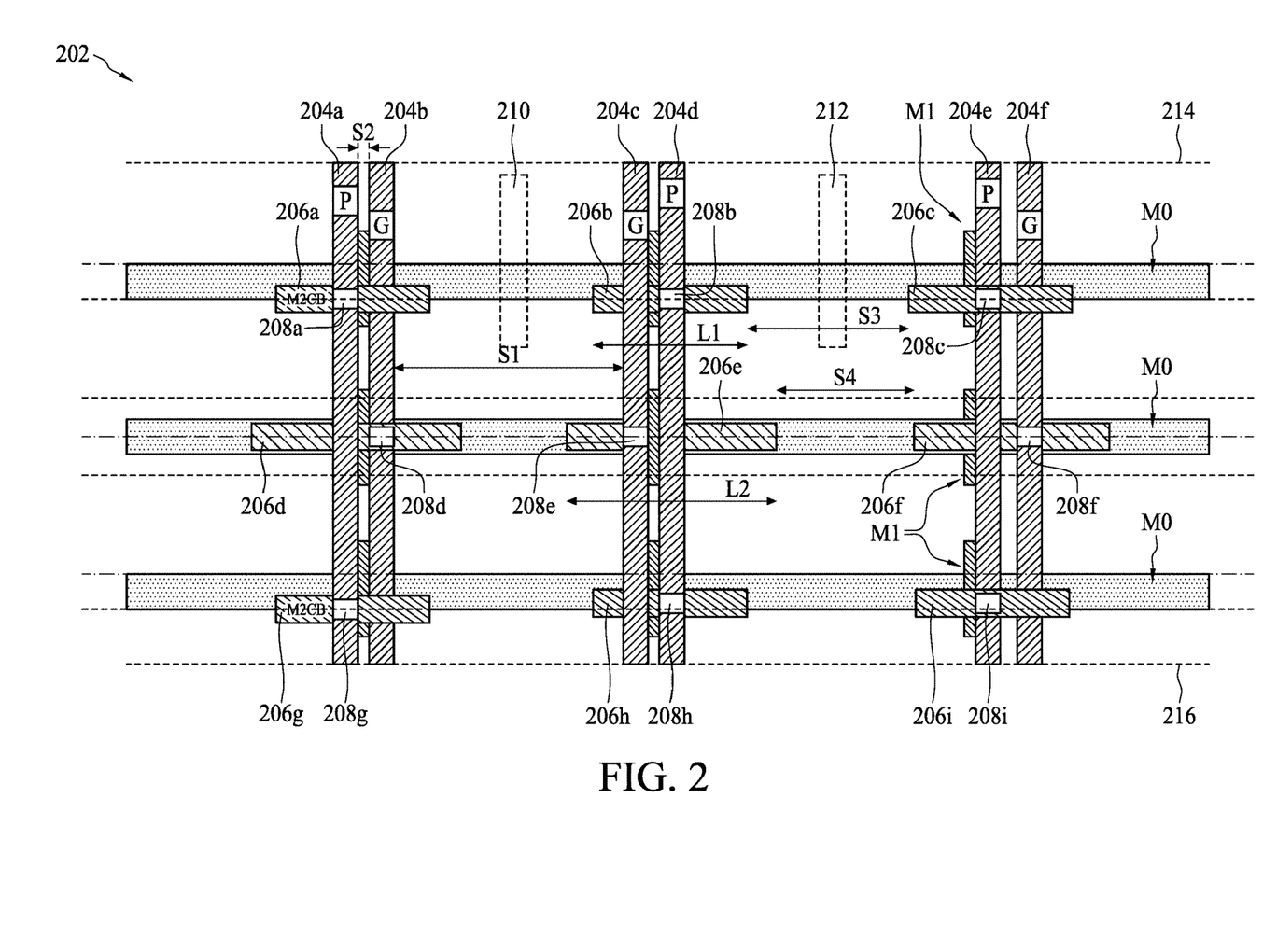
FIG. 2 is a top-view diagram illustrating a power grid of an integrated circuit in accordance with some embodiments.

FIG. 2 is a top-view diagram illustrating a power grid 200 of an integrated circuit 202 in accordance with some embodiments. The power grid 200 comprises a plurality of vertical metal lines 204a, 204b, 204c, 204d, 204e, 204f in metal layer M3, and a plurality of horizontal metal lines 206a, 206b, 206c, 206d, 206e, 206f, 206g, 206h, 206i in metal layer M2. In addition, the power grid 200 further comprises a plurality of via structures 208a, 208b, 208c, 208d, 208e, 208f, 208g, 208h, 208i for connecting the corresponding metal lines in the metal layers M3 and M2. Specifically, the via structure 208a is arranged to connect the metal lines 204a and 206a. The via structure 208b is arranged to connect the metal lines 204d and 206b. The via structure 208c is arranged to connect the metal lines 204e and 206c. The via structure 208d is arranged to connect the metal lines 204b and 206d. The via structure 208e is arranged to connect the metal lines 204c and 206e. The via structure 208f is arranged to connect the metal lines 204f and 206f. The via structure 208g is arranged to connect the metal lines 204a and 206g. The via structure 208h is arranged to connect the metal lines 204d and 206h. The via structure 208i is arranged to connect the metal lines 204e and 206i. It is noted that, FIG. 2 merely labeled out the metal lines in metal layers M3 and M2 and the via structures connecting metal lines in the metal layers M3 and M2, and the metal lines in metal layers M1 and M0 are not labeled for brevity.

According to some embodiments, the plurality of vertical metal lines 204a, 204b, 204c, 204d, 204e, and 204f are continuous metal lines disposed on vertical direction in FIG. 2, and the plurality of horizontal metal lines 206a, 206b, 206c, 206d, 206e, 206f, 206g, 206h, and 206i are non-continuous metal lines disposed on horizontal direction in FIG. 2. For example, the plurality of vertical metal lines 204a, 204b, 204c, 204d, 204e, and 204f are continuous metal lines extending to the lower bound 216 from the upper bound 214 of the power grid 200. The plurality of horizontal metal lines 206a, 206b, and 206c, as well as the metal lines 206d, 206e, 206f and the metal lines 206g, 206h, 206i, are arranged to non-continuously extending to the right side from the left side of the power grid 200. It is noted that, in FIG. 2, the vertical direction is orthogonal to the horizontal direction.

According to some embodiments, the plurality of vertical metal lines 204a, 204d, and 204e are electrically connected to supply voltage or power source, and the plurality of vertical metal lines 204b, 204c, and 204f are electrically connected to ground voltage. The vertical metal lines 204a and 204b are neighboring metal lines. The vertical metal lines 204c and 204d are neighboring metal lines. The vertical metal lines 204e and 204f are neighboring metal lines. The space with the width S1 between two neighboring metal lines is greater than the space with the width S2 between the neighboring metal lines. Therefore, the power grid 200 may be an non-uniform power grid structure.

According to some embodiments, the metal lines 206a, 206b, 206c, 206g, 206h, and 206i are arranged to have the same length L1, and the metal lines 206d, 206d, and 206f are arranged to have the same length L2. The length L2 is greater than the length L1.

In addition, the horizontal space between the two adjacent metal lines (e.g. the space between the metal lines 206b and 206c) selected from the metal lines 206a, 206b, 206c, 206g, 206h, and 206i has the width S3. The horizontal space between the two adjacent metal lines (e.g. the space between the metal lines 206e and 206f) selected from the metal lines 206d, 206e, and 206f has the width S4. The width S3 is greater than the width S4. According to some embodiments, the space with the width S3 is wide enough for a metal line or signal route to pass through. For example, a signal route 210 is arranged to pass through the space between the metal lines 206a and 206b, and a signal route 212 is be arranged to pass through the space between the metal lines 206b and 206c. In addition, a signal route (not shown) may be arranged to pass through the space between the metal lines 206g and 206h, and a signal route (not shown) may be arranged to pass through the space between the metal lines 206h and 206i. It is noted that the signal routes (e.g. 210) are formed in the metal layer M0 and may be electrically connected other metal layer through conductive vias. On the other hand, the space with the width S4 is too narrow for a metal line or signal route to pass through. Therefore, there is not signal route to pass through the space between the metal lines 206d and 206e and the space between the metal lines 204e and 204f.

Figure 3:
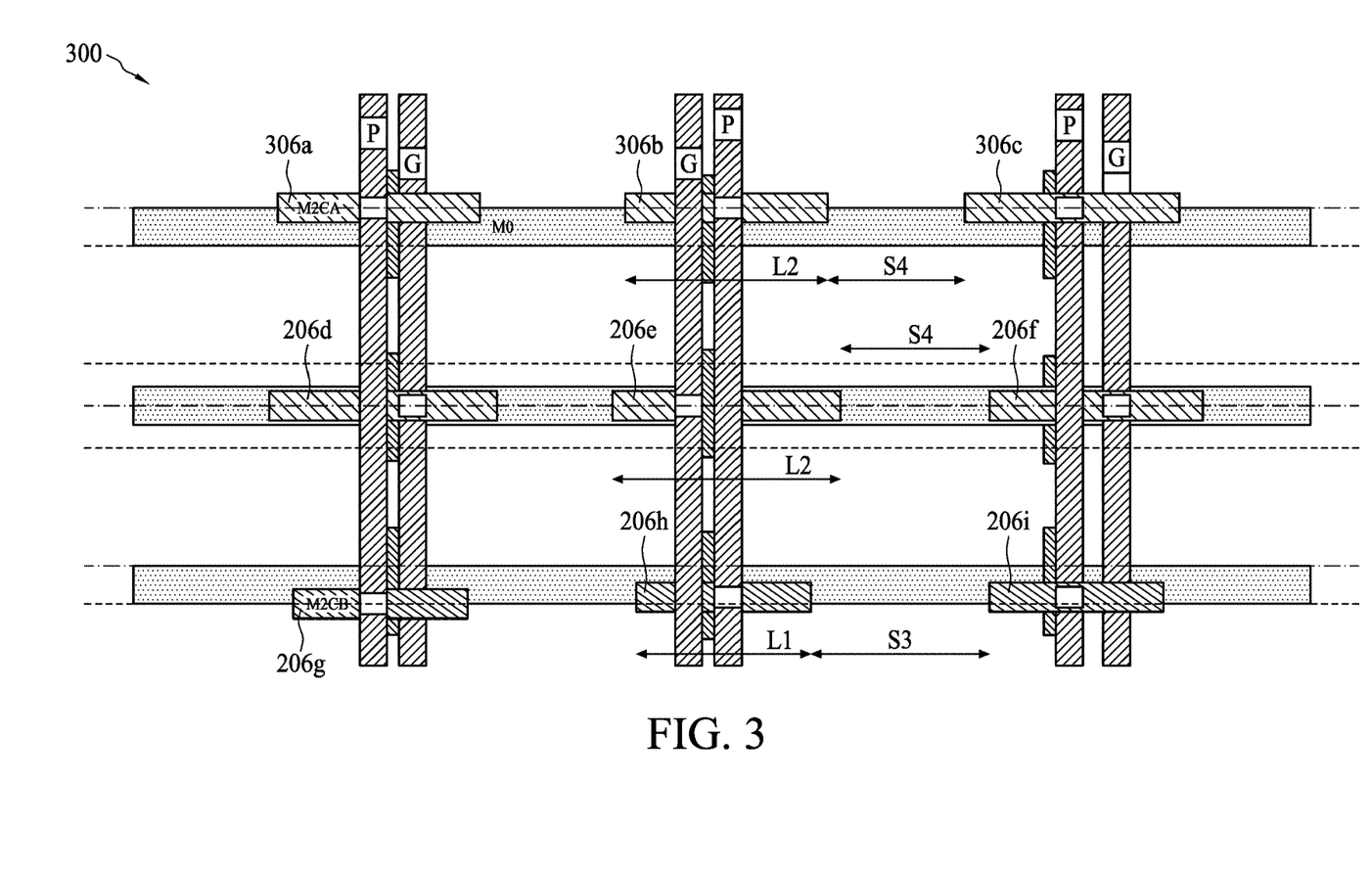
FIG. 3 is a top-view diagram illustrating a related art of a power grid.

FIG. 3 is a top-view diagram illustrating a related art of a power grid 300. The power grid 300 is a counterpart of the power grid 200. For brevity, some numerals in the power grid 300 are similar to the numerals in the power grid 200. The elements of the power grid 300 having the same numerals with those in the power grid 200 also have the similar characteristic. In the power grid 300, the lengths (i.e. L2) of the metal lines 306a, 306b, and 306c are similar to the lengths (i.e. L2) of the metal lines 206d, 206e, and 206f respectively. Therefore, the space (i.e. S4) between the metal lines 306a and 306b is similar to the space (i.e. S4) between the metal lines 206d and 206e, and the space (i.e. S4) between the metal lines 306b and 306c is similar to the space (i.e. S4) between the metal lines 206e and 206f. As mentioned above, the space with S4 is too narrow for a metal line or signal route to pass through. Therefore, there is not signal route to pass through the space between the metal lines 306a and 306b and the space between the metal lines 306b and 306c.

Accordingly, in comparison to the power grid 300, the present power grid 200 provides extra space (e.g. the space between the metal lines 206a and 206b and the space between the metal lines 206b and 206c) for signal net routing on the BEOL of the integrated circuit 102. Therefore, in comparison to the power grid 300, the routing resource of the power grid 200 is increase.

Figure 4:
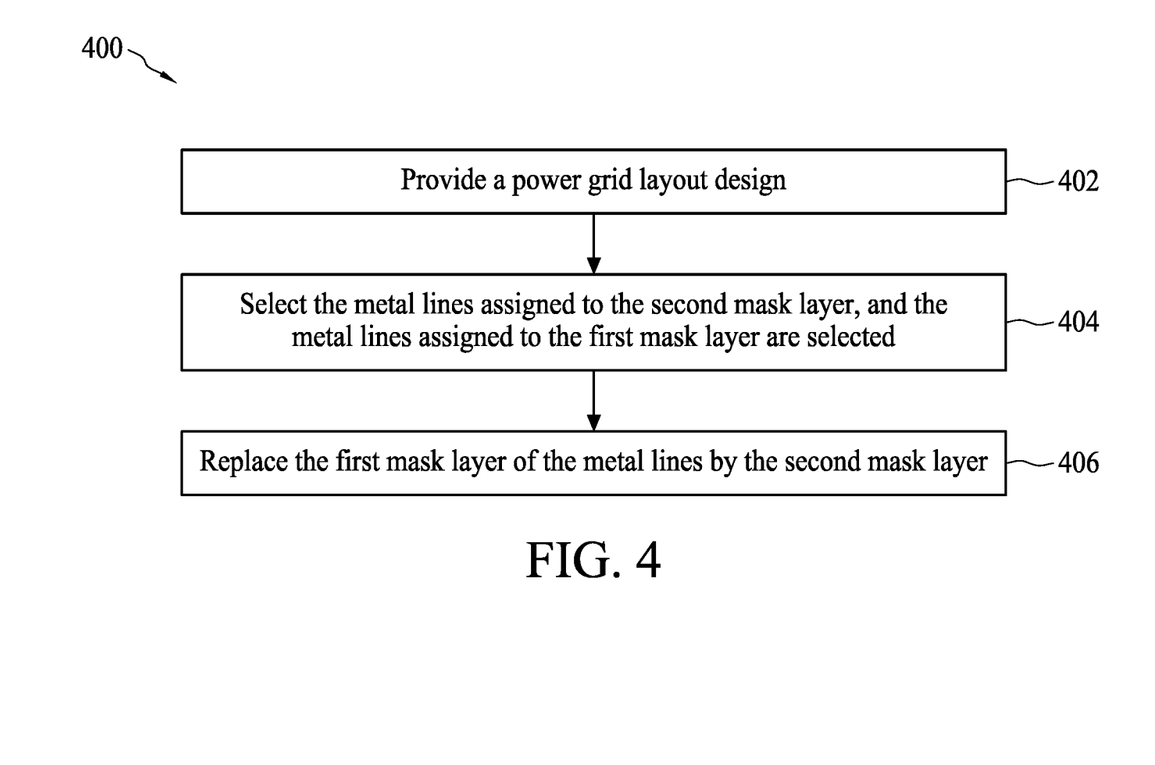
FIG. 4 is a flow chart illustrating a method of forming a power grid of an integrated circuit in accordance with some embodiments.

FIG. 4 is a flow chart illustrating a method 400 of forming a power grid (e.g. 200) of an integrated circuit in accordance with some embodiments. The method 400 is arranged to perform on a power grid layout design. The method 400 comprises operations 402~406.

Figure 5:
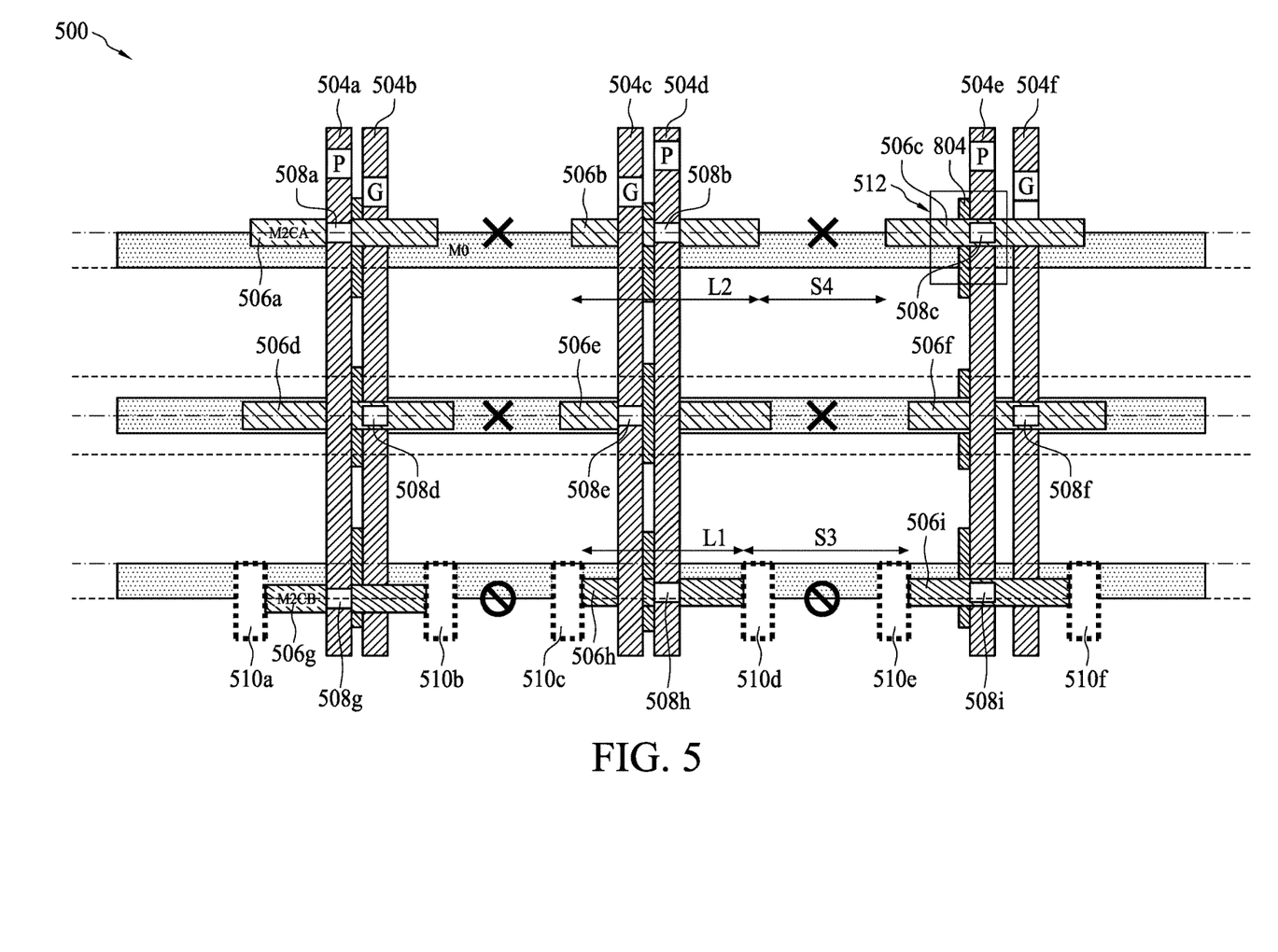
FIG. 5 is a diagram illustrating a power grid layout design in accordance with some embodiments.

In operation 402, a power grid layout design 500 is provided. FIG. 5 is a diagram illustrating the power grid layout design 500 in accordance with some embodiments. The power grid layout design 500 may be created by a layout creating software. The power grid layout design 500 may be processed by a processor and displayed on a display tool. According to some embodiments, the power grid layout design 500 a plurality of vertical metal lines 504a, 504b, 504c, 504d, 504e, 504f in metal layer M3, and a plurality of horizontal metal lines 506a, 506b, 506c, 506d, 506e, 506f, 506g, 506h, 506i in metal layer M2. In addition, the power grid layout design 500 further comprises a plurality of via structures 508a, 508b, 508c, 508d, 508e, 508f, 508g, 508h, 508i for connecting the corresponding metal lines in the metal layers M3 and M2.

The via structure 508a is arranged to connect the metal lines 504a and 506a. The via structure 508b is arranged to connect the metal lines 504d and 506b. The via structure 508c is arranged to connect the metal lines 504e and 506c. The via structure 508d is arranged to connect the metal lines 504b and 506d. The via structure 508e is arranged to connect the metal lines 504c and 506e. The via structure 508f is arranged to connect the metal lines 504f and 506f. The via structure 508g is arranged to connect the metal lines 504a and 506g. The via structure 508h is arranged to connect the metal lines 504d and 506h. The via structure 508i is arranged to connect the metal lines 504e and 506i.

According to some embodiments, although the horizontal metal lines 506a, 506b, 506c, 506d, 506e, 506f, 506g, 506h, 506i are formed in the same metal layer (i.e. the metal layer M2), the metal lines 506a, 506b, 506c, 506d, 506e, 506f are assigned to or masked by a first mask layer, and the metal lines 506g, 506h, 506i are assigned to a second mask layer during the manufacturing process. The second mask layer is different from the first mask layer. The first mask layer does not have the function of cut-metal while the second mask layer has the function of cut-metal. The function of cut-metal may be carried out by a cut-metal pattern. A cut-metal pattern is a layer for removing a portion of a metal line when the cut-metal pattern overlaps the portion of the metal line.

In addition, when the metal lines 506a, 506b, 506c, 506d, 506e, 506f are assigned by the first mask layer, the metal lines 506a, 506b, 506c, 506d, 506e, 506f are displayed by a first color (e.g. red) on the display tool. When the metal lines 506g, 506h, 506i are assigned by the second mask layer, the metal lines 506g, 506h, 506i are displayed by a second color (e.g. pink) different from the first color on the display tool.

According to some embodiments, the power grid layout design 500 further comprises a plurality of cut-metal patterns 510a, 510b, 510c, 510d, 510e, and 510f. The cut-metal patterns 510a and 510b are disposed on a first end and a second end of the metal line 506g. The cut-metal patterns 510c and 510d are disposed on a first end and a second end of the metal line 506h. The cut-metal patterns 510e and 510f are disposed on a first end and a second end of the metal line 506h. There has no cut-metal pattern disposed on the metal lines 506a, 506b, 506c, 506d, 506e, 506f. As a portion of each of the metal lines 506g, 506h, and 506i is removed by the corresponding cut-metal pattern, the length L2 of each of the cut-metal patterns 510a, 510b, 510c, 510d, 510e, and 510f is greater than the length L1 of each of the metal lines 506g, 506h, and 506i if the power grid layout design 500 is fabricated (e.g. the power grid 300 as shown in FIG. 3).

In the power grid layout design 500, the space between the metal lines 506a and 506b and the space the metal lines 506b and 506c are S4, which is smaller than the space (i.e. S3) between the metal lines 506g and 506h and the space between the metal lines 506h and 506i. Therefore, there is not signal route to pass through the space between the metal lines 506a and 506b and the space between the metal lines 506b and 506c.

It is noted that, FIG. 5 merely labeled out the metal lines in metal layers M3 and M2 and the via structures interconnecting the metal lines in the metal layers M3 and M2, and the metal lines in metal layers M1 and M0 are not labeled for brevity.

In operation 404, the metal lines 506g, 506h, and 506i assigned to the second mask layer, and the metal lines 506a, 506b, and 506c assigned to the first mask layer are selected.

Figure 6:
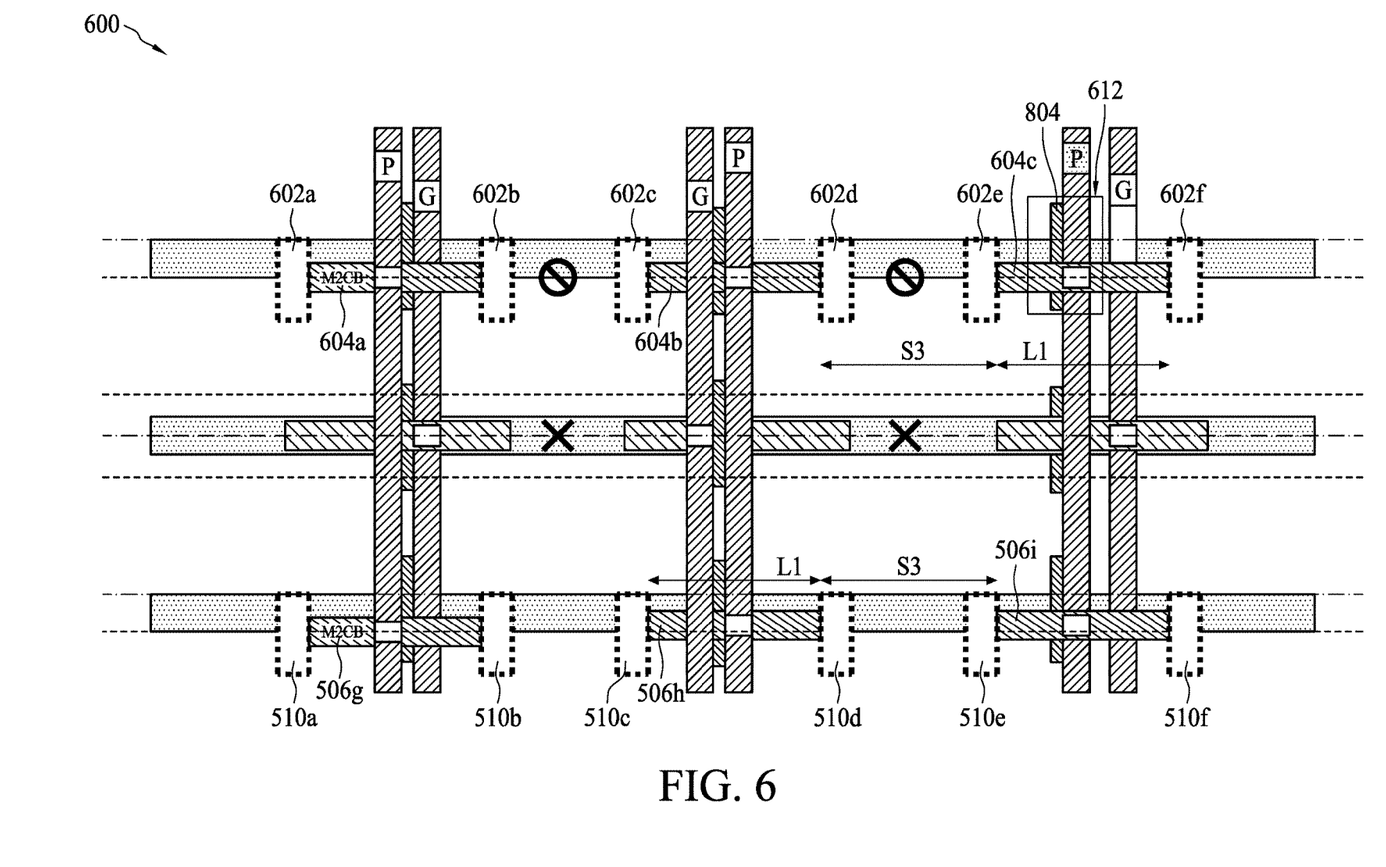
FIG. 6 is a diagram illustrating a power grid layout design in accordance with some embodiments.

In operation 406, the first mask layer of the metal lines 506a, 506b, and 506c is replaced by or changed to the second mask layer. FIG. 6 is a diagram illustrating the power grid layout design 600 in accordance with some embodiments. As shown in FIG. 6, when the metal lines 506a, 506b, and 506c is replaced by the second mask layer, a plurality of cut-metal patterns 602a, 602b, 602c, 602d, 602e, and 602f are disposed on the first ends and the second ends of the metal lines 506a, 506b, and 506c. For brevity, the metal lines 506a, 506b, and 506c are re-numbered into 604a, 604b, and 606c respectively in FIG. 6. When the cut-metal patterns 602a, 602b, 602c, 602d, 602e, and 602f are disposed on the first ends and the second ends of the metal lines 604a, 604b, and 604c respectively, the length of each of the metal lines 604a, 604b, and 604c may be reduced from L2 to L1, which is similar to the length of the metal lines 506g, 506h, and 506i. Accordingly, in the power grid layout design 600, the space between the metal lines 604a and 604b and the space the metal lines 604b and 604c are S3, which is similar to the space (i.e. S3) between the metal lines 506g and 506h and the space between the metal lines 506h and 506i. Therefore, signal routes may pass through the space between the metal lines 604a and 604b and the space between the metal lines 604b and 604c.

Accordingly, when the metal lines 604a, 604b, and 604c are assigned to the second mask layer, the metal lines 604a, 604b, and 604c are displayed by the second color (e.g. pink) on the display tool.

Figure 7:
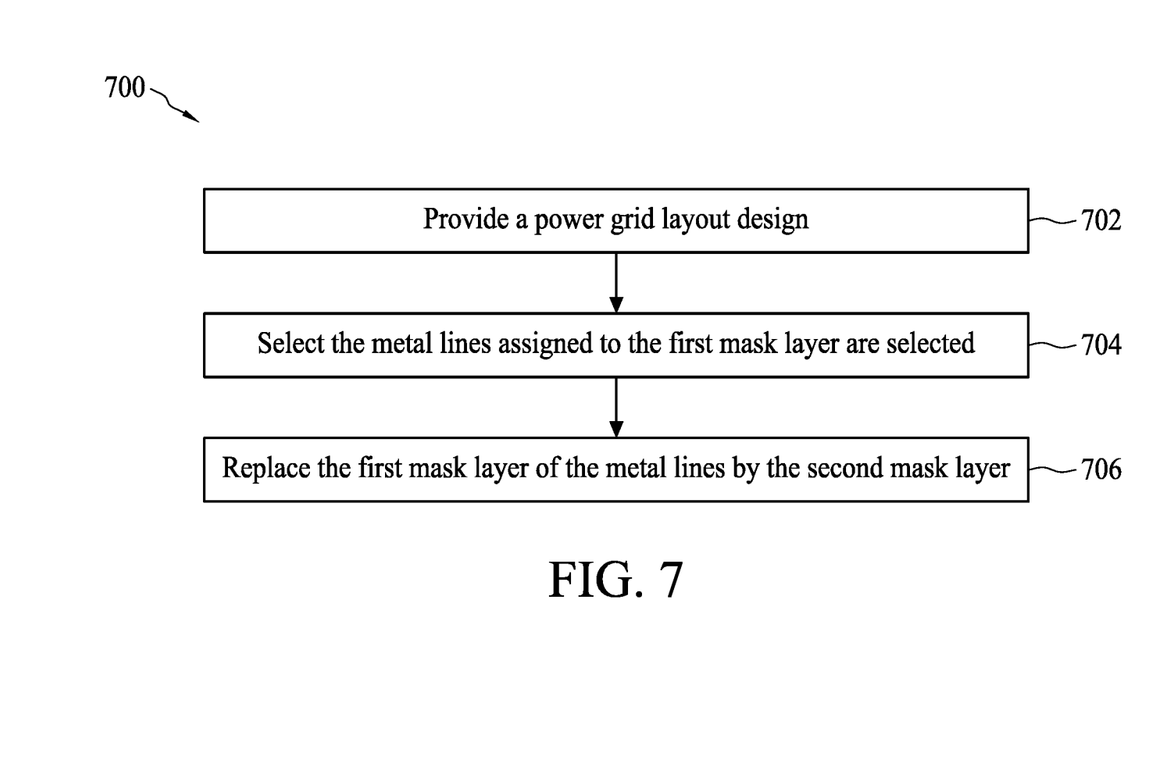
FIG. 7 is a flow chart illustrating a method of forming a power grid of an integrated circuit in accordance with some embodiments.

FIG. 7 is a flow chart illustrating a method 700 of forming a power grid (e.g. 200) of an integrated circuit in accordance with some embodiments. The method 700 is arranged to perform on the power grid layout design 500. The method 700 comprises operations 702~706. For brevity, the operation of method 700 is described by using the above FIG. 5 and FIG. 6.

In operation 702, the power grid layout design 500 is provided. As the power grid layout design 500 has been described in above paragraphs, the detailed description is omitted here for brevity.

In operation 704, the metal lines 506a, 506b, and 506c, 506d, 506e, and 506f assigned to the first mask layer are selected.

In operation 706, the first mask layer of the metal lines 506a, 506b, and 506c is replaced by or changed to the second mask layer as shown in FIG. 6. As shown in FIG. 6, the metal lines 506a, 506b, and 506c are re-numbered into 604a, 604b, and 606c respectively. When the cut-metal patterns 602a, 602b, 602c, 602d, 602e, and 602f are disposed on the first ends and the second ends of the metal lines 604a, 604b, and 604c respectively, the length of each of the metal lines 604a, 604b, and 604c may be reduced from L2 to L1, which is similar to the length of the metal lines 506g, 506h, and 506i. Accordingly, in the power grid layout design 600, the space between the metal lines 604a and 604b and the space the metal lines 604b and 604c are S3, which is similar to the space (i.e. S3) between the metal lines 506g and 506h and the space between the metal lines 506h and 506i. Therefore, signal routes may pass through the space between the metal lines 604a and 604b and the space between the metal lines 604b and 604c.

According to some embodiments, when the metal lines 506a, 506b, and 506c are changed to the second mask layer from the first mask layer, the positions of the metal lines 604a, 604b, and 604c may not be the same positions to the metal lines 506a, 506b, and 506c respectively. In other words, the positions of the metal lines 604a, 604b, and 604c may deviate from the original positions of the metal lines 506a, 506b, and 506c respectively. However, this deviation may not affect the predetermined function of the power grid layout design 600.

Figure 8A:
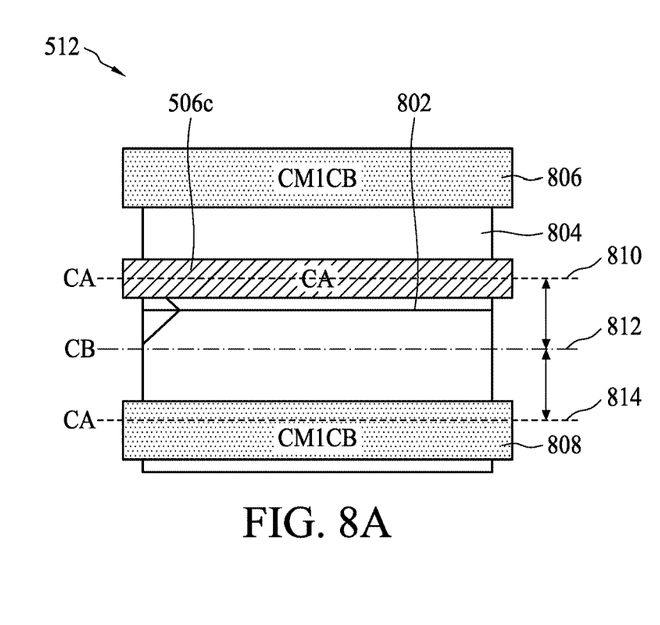
FIG. 8A is a diagram illustrating a layout portion in the power grid layout design of FIG. 5 in accordance with some embodiments.
Figure 8B:
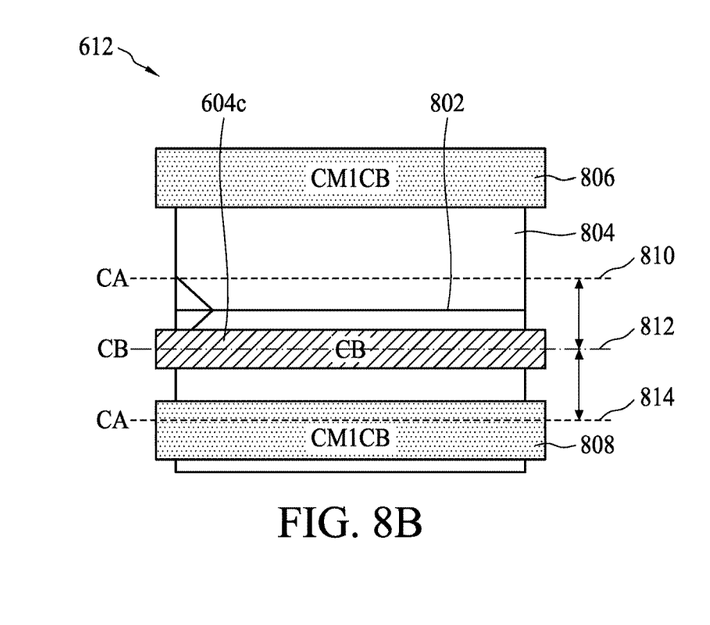
FIG. 8B is a diagram illustrating a layout portion in the power grid layout design of FIG. 6 in accordance with some embodiments.

FIG. 8A is a diagram illustrating a layout portion 512 in the power grid layout design 500 in accordance with some embodiments. FIG. 8B is a diagram illustrating a layout portion 612 in the power grid layout design 600 in accordance with some embodiments. For the sake of comparison, the location of the layout portion 612 corresponds to the location of the layout portion 512. In the layout portion 512 as well as the layout portion 612, a site row 802 is formed on the metal line 804, wherein the metal line 804 is formed in the metal layer M1. It is noted that the metal line 506c as well as the metal line 604c are formed in the metal layer M2. Moreover, a site row is a line where two or more standard cells abut vertically. A cut-metal pattern 806 is disposed on one end of the metal line 804, and the other cut-metal pattern 808 is disposed on the other end of the metal line 804.

In addition, in the layout portion 512 as well as the layout portion 612, there has three dotted lines 810, 812, and 814 in parallel to the site row 802. The dotted line 810 is slightly above the site row 802. For example, the dotted line 810 may be +20 nm offset from the site row 802. The dotted line 810 or 814 are the locations for forming the metal line 506c by using the first mask layer. The dotted line 812 is the location for forming the metal line 604c by using the second mask layer. According to some embodiments, the metal line 506c assigned to the first mask layer is formed on the dotted line 810. When the metal line 506c is re-assigned to the second mask layer, the position of the re-assigned metal line 604c is changed to the dotted line 812 as shown in FIG. 8B. It is noted that as long as the metal line 604c is located in the area between the dotted lines 810 and 814, the metal line 604c may electrically connected to the metal line formed in the metal layer M0, which is disposed under the metal layer M1, in order to deliver power from power source to the corresponding semiconductor cell in the integrated circuit.

Figure 9A:
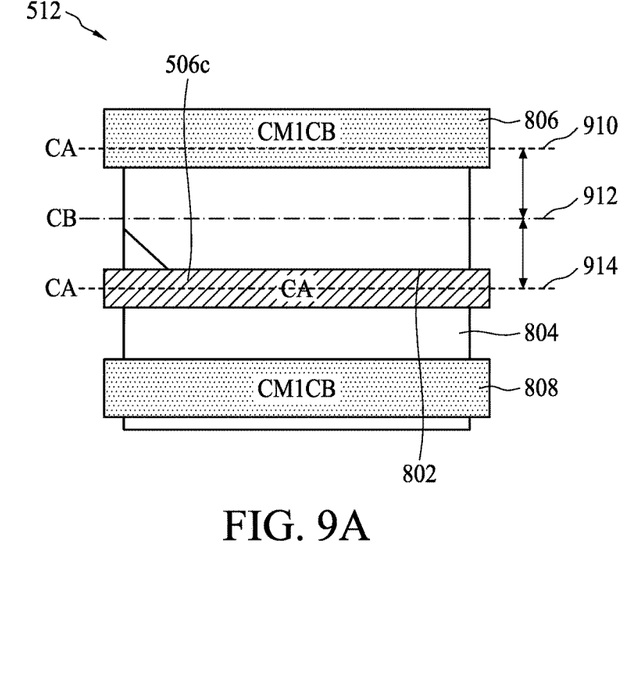
FIG. 9A is a diagram illustrating a layout portion in the power grid layout design of FIG. 5 in accordance with some embodiments.
Figure 9B:
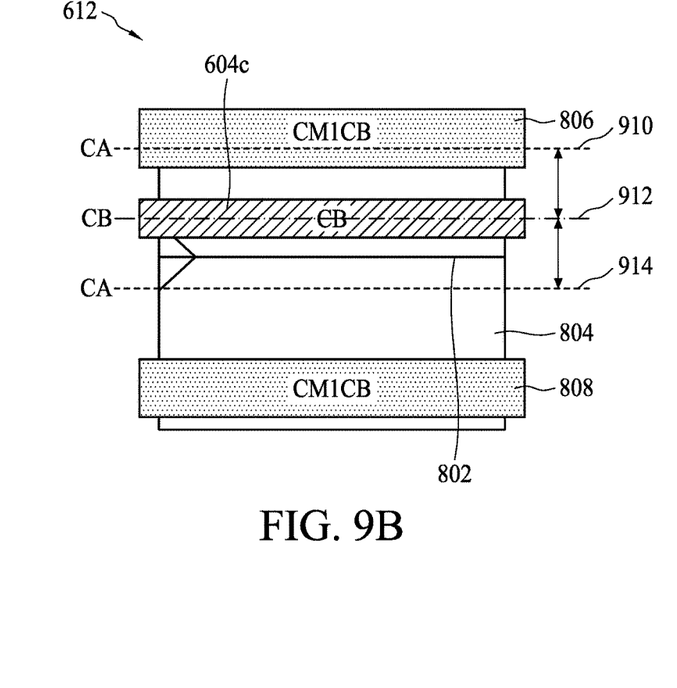
FIG. 9B is a diagram illustrating a layout portion in the power grid layout design of FIG. 6 in accordance with some embodiments.

FIG. 9A is a diagram illustrating a layout portion 512 in the power grid layout design 500 in accordance with some embodiments. FIG. 9B is a diagram illustrating a layout portion 612 in the power grid layout design 600 in accordance with some embodiments. Similar to FIG. 8A and FIG. 8B, the location of the layout portion 612 corresponds to the location of the layout portion 512. In the layout portion 512 as well as the layout portion 612, a site row 802 is formed on the metal line 804, wherein the metal line 804 is formed in the metal layer M1. It is noted that the metal line 506c as well as the metal line 604c are formed in the metal layer M2. A cut-metal pattern 806 is disposed on one end of the metal line 804, and the other cut-metal pattern 808 is disposed on the other end of the metal line 804.

In comparison to FIG. 8A and FIG. 8B, the locations of the dotted lines 910, 912, and 914 are different from the dotted lines 810, 812, and 814. In FIG. 9A and FIG. 9B, the dotted line 914 is slightly below the site row 802. For example, the dotted line 914 may be −20 nm offset from the site row 802. The dotted line 910 or 914 are the locations for forming the metal line 506c by using the first mask layer. The dotted line 912 is the location for forming the metal line 604c by using the second mask layer. According to some embodiments, the metal line 506c assigned to the first mask layer is formed on the dotted line 914. When the metal line 506c is re-assigned to the second mask layer, the position of the re-assigned metal line 604c is changed to the dotted line 912 as shown in FIG. 9B. It is noted that as long as the metal line 604c is located in the area between the dotted lines 910 and 914, the metal line 604c may electrically connected to the metal line formed in the metal layer M0, which is disposed under the metal layer M1, in order to deliver power from power source to the corresponding semiconductor cell in the integrated circuit.

Figure 10:
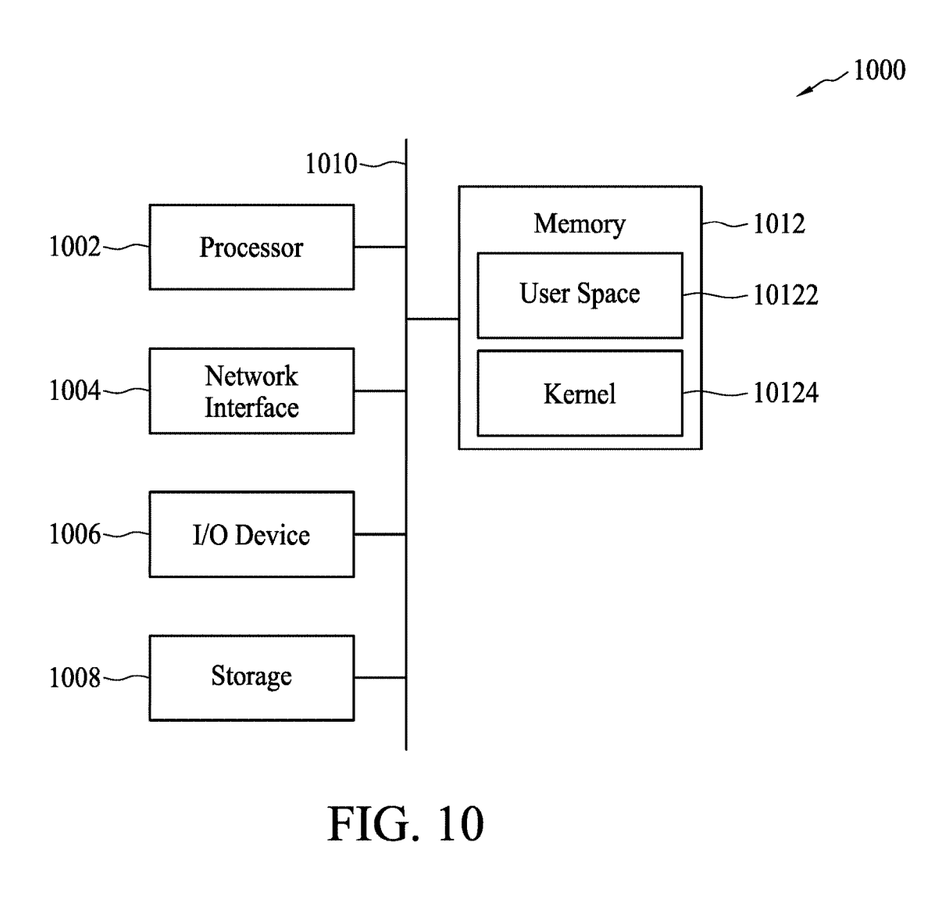
FIG. 10 is a diagram of a hardware system for implementing a method to generate a power grid layout design in accordance with some embodiments.

FIG. 10 is a diagram of a hardware system 1000 for implementing the method 400 to generate the power grid layout design 600 in accordance with some embodiments. The system 2500 includes at least one processor 1002, a network interface 1004, an input and output (I/O) device 1006, a storage 1008, a memory 1012, and a bus 1010. The bus 1010 couples the network interface 1004, the I/O device 1006, the storage 1008 and the memory 1012 to the processor 1002.

In some embodiments, the memory 1012 comprises a random access memory (RAM) and/or other volatile storage device and/or read only memory (ROM) and/or other non-volatile storage device. The memory 1012 includes a kernel 1016 and user space 1014, configured to store program instructions to be executed by the processor 1002 and data accessed by the program instructions.

In some embodiments, the network interface 1004 is configured to access program instructions and data accessed by the program instructions stored remotely through a network. The I/O device 1006 includes an input device and an output device configured for enabling user interaction with the system 1000. The input device comprises, for example, a keyboard, a mouse, etc. The output device comprises, for example, a display, a printer, etc. The storage device 1008 is configured for storing program instructions and data accessed by the program instructions. The storage device 1008 comprises, for example, a magnetic disk and an optical disk.

In some embodiments, when executing the program instructions, the processor 1002 is configured to perform the operations of the method 400 (or 700) as described with reference to FIG. 4 (or FIG. 7).

In some embodiments, the program instructions are stored in a non-transitory computer readable recording medium such as one or more optical disks, hard disks and non-volatile memory devices.

Figure 11:
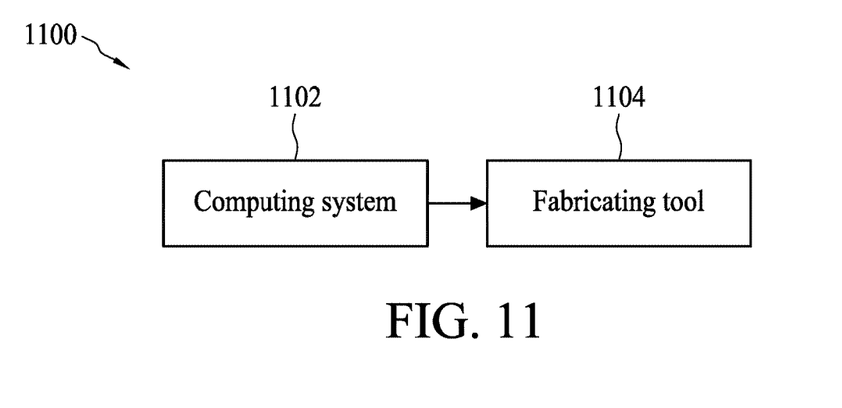
FIG. 11 is a diagram of a system for fabricating a power grid in accordance with some embodiments.

FIG. 11 is a diagram of a system 1100 for fabricating the power grid 300 in accordance with some embodiments. The system 1100 comprises a computing system 1102 and a fabricating tool 1104. The computing system 1102 is arranged to perform operations of the method 400 (or 700) to generate the power grid layout design 600. The computing system 1102 may be the above system 1000. The fabricating tool 1104 may be a cluster tool for fabricating a integrated circuit. The cluster tool may be a multiple reaction chamber type composite equipment which includes a polyhedral transfer chamber with a wafer handling robot inserted at the center thereof, a plurality of process chambers positioned at each wall face of the polyhedral transfer chamber; and a loadlock chamber installed at a different wall face of the transfer chamber. At the fabrication stage, at least one photomask is used, for example, for one patterning operation for forming a feature of ICs, such as gate lines of transistors, source or drain regions for the transistors, metal lines for interconnects and vias for the interconnects, on a wafer.

Figure 12:
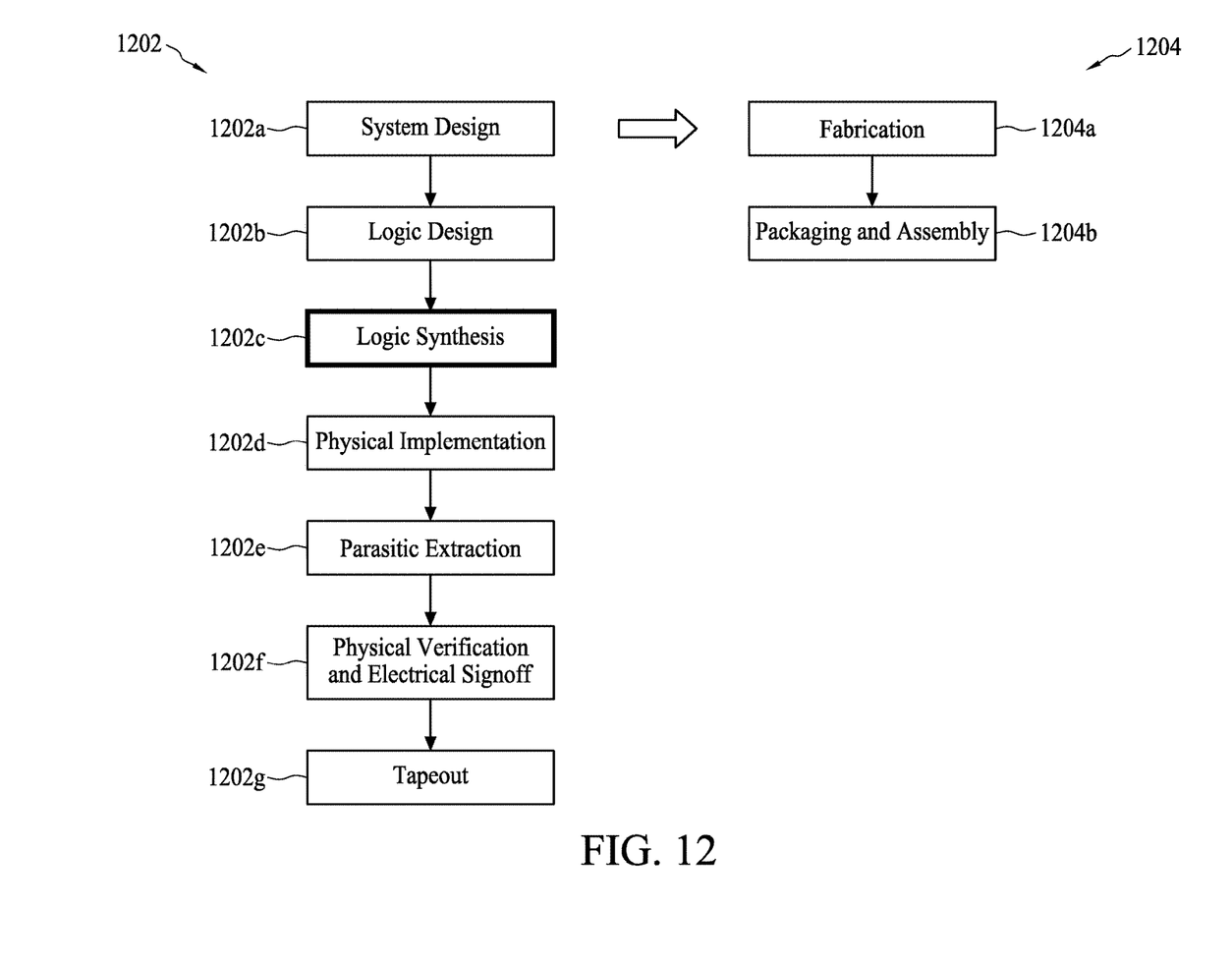
FIG. 12 is a flowchart of a chip design flow and a chip manufacturing flow of an integrated circuit chip in accordance with some embodiments.

FIG. 12 is a flowchart of a chip design flow 1202 and a chip manufacturing flow 1204 of an integrated circuit (IC) chip in accordance with some embodiments. The chip design flow 1202 implements an IC chip design from a high-level specification to a physical layout which is verified for, for example, functionality, performance, and power, and is tapped out for production of masks. One or more electronic design automation (EDA) tools is arranged to carry out one or more stages or operations in the flows of the chip design flow 1202. The chip manufacturing flow 1204 manufactures the IC chip using the masks.

In some embodiments, the chip design flow 1202 includes a system design stage 1202a, a logic design stage 1202b, a logic synthesis stage 1202c, a physical implementation 1202d, a parasitic extraction stage 1202e and a physical verification and electrical signoff stage 1202f, and a tape out stage 1202g.

At the system design stage 1202a, the designer describes the IC chip in terms of larger modules that serve specific functions, respectively. Further, exploration for options include design architectures is performed to consider, for example, tradeoffs in optimizing design specifications and cost.

At the logic design stage 1202b, the modules for the IC chip are described at the register transfer level (RTL) using the VHDL or Verilog, and are verified for functional accuracy.

At the logic synthesis stage 1202c, the modules for the IC chip described in RTL are translated into a gate-level netlist. Technology mapping of the logic gates and registers to available cells in the created standard cell library from the cell design flow 100 also happen at this stage.

At the physical implementation stage 1202d, the gate-level netlist is partitioned into blocks and a floorplan for the blocks is created for a design layout. Mapped cells of logic gates and registers in the blocks are placed at specific locations in the design layout. Router-routed interconnects connecting the placed cells are created. In some embodiments, during placement and routing, total wire length, wiring congestion and/or timing are optimized. Using the combined cells facilitates such optimization.

At the parasitic extraction stage 1202e, a physical netlist is extracted from the design layout. The physical netlist includes parasitics such as parasitic resistors and capacitors introduced by the interconnects to the cells.

At the physical verification and electrical signoff stage 1202f, timing analysis and post-route optimization are performed on the physical netlist to ensure timing closure. The design layout is checked to ensure clean of, for example, design rule check (DRC) issues, layout versus schematic issues (LVS) and electrical rule check (ERC) issues. Incremental fixing can be performed to achieve electrical signoff of the IC design.

At the tapeout stage 1202g, the design layout is checked to ensure clean of, for example, photolithography issues and is modified using, for example, optical proximity correction (OPC) techniques. For each layer in the final design layout, a corresponding photomask, for example, is created for manufacturing of the IC chip. According to some embodiments, the first mask layer and the second mask layer as mentioned in the operation 406 are fabricated in this stage. The first mask layer is arranged have patterns corresponding to the metal lines 506d, 506e, and 506f. The second mask layer is arranged to have patterns corresponding to the metal lines 604a, 604b, 604c, 506g, 506h, and 506i.

In some embodiments, the chip manufacturing flow 1204 includes a fabrication stage 1204a and a packaging and testing stage 1204b.

At the fabrication stage 1204a, the photomask(s) is used, for example, for one patterning operation for forming a feature of ICs, such as gate lines of transistors, source or drain regions for the transistors, metal lines for interconnects and vias for the interconnects, on a wafer. According to some embodiments, the first mask layer is arranged to form the metal lines 506d, 506e, and 506f. The second mask layer is arranged to form the metal lines 604a, 604b, 604c, 506g, 506h, and 506i.

At the packaging and assembly stage 1204b, ICs on the wafer are diced into IC chips and are packaged considering, for example, protection from mechanical damaging, cooling, electromagnetic interference and protection from electrostatic discharge. An IC chip may be assembled with other components for use.

The chip design flow 1202 and the chip manufacturing flow 1204 in FIG. 12 are exemplary. Other sequences of the stages or sequences of operations in the stages, or additional stages or operations before, between or after the stages shown are within the applicable scope of the present disclosure.

Briefly, by using the proposed methods, the lengths of some horizontal metal lines in a power grid of an integrated circuit are reduced. Accordingly, the size of the power grid is reduced. Moreover, the power grid also provides extra space for signal net routing on the BEOL of the integrated circuit.

According to some embodiments, a method of forming an integrated circuit is provided. The method comprises: forming a conductive grid on a semiconductor substrate, wherein the conductive grid has a plurality of continuous conductive lines arranged in a first direction on a first conductive layer and a plurality of non-continuous conductive lines arranged in a second direction on a second conductive layer; selecting a plurality of first conductive lines from the plurality of non-continuous conductive lines according to a first mask layer assigned to the plurality of first conductive lines; selecting a plurality of second conductive lines from the plurality of non-continuous conductive lines according to a second mask layer assigned to the plurality of second conductive lines, wherein the second mask layer different from the first mask layer, and the plurality of second conductive lines is electrically connected to the plurality of first conductive lines via the plurality of continuous conductive lines; and replacing the plurality of second conductive lines by a plurality of third conductive lines respectively when the plurality of first conductive lines has a cut-metal pattern and the plurality of second conductive lines does not have the cut-metal pattern, wherein the plurality of third conductive lines is assigned to the first mask layer.

According to some embodiments, a method of forming an integrated circuit is provided. The method comprises: forming a conductive grid on a semiconductor substrate, wherein the conductive grid has a plurality of continuous conductive lines arranged in a first direction on a first conductive layer and a plurality of non-continuous conductive lines arranged in a second direction on a second conductive layer; selecting a plurality of first conductive lines from the plurality of non-continuous conductive lines; selecting a plurality of second conductive lines from the plurality of non-continuous conductive lines; and replacing the plurality of second conductive lines by a plurality of third conductive lines respectively when the plurality of first conductive lines and the plurality of second conductive lines are assigned to a first mask, wherein the plurality of third conductive lines is assigned to a second mask different from the first mask layer.

According to some embodiments, a system is provided. The at least one processor is configured to execute program instructions which configure the at least one processor as a processing tool that perform operations comprising: forming, by the processing tool, a conductive grid on a semiconductor substrate, wherein the conductive grid has a plurality of continuous conductive lines arranged in a first direction on a first conductive layer and a plurality of non-continuous conductive lines arranged in a second direction on a second conductive layer; selecting, by the processing tool, a first conductive line and a second conductive line from the plurality of non-continuous conductive lines, wherein a space between the first conductive line and the second conductive line has a first width; selecting, by the processing tool, a third conductive line and a fourth conductive line from the plurality of non-continuous conductive lines, wherein the space between the third conductive line and the fourth conductive line has a second width; and replacing, by the processing tool, the third conductive line and the fourth conductive line by a fifth conductive line and a sixth conductive line respectively, wherein the space between the fifth conductive line and the sixth conductive line has the first width, and the second width is greater than the first width.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated circuit:
   forming a conductive grid on a semiconductor substrate, wherein the conductive grid has a plurality of continuous conductive lines arranged in a first direction on a first conductive layer and a plurality of non-continuous conductive lines arranged in a second direction on a second conductive layer;
   selecting a plurality of first conductive lines from the plurality of non-continuous conductive lines;
   selecting a plurality of second conductive lines from the plurality of non-continuous conductive lines; and
   replacing the plurality of second conductive lines by a plurality of third conductive lines respectively when a cut-metal pattern is included in the plurality of first conductive lines and excluded from the plurality of second conductive lines, wherein the plurality of third conductive lines is assigned to a same mask layer as the plurality of the first conductive lines.

2. The method of claim 1, wherein the first direction is orthogonal to the second direction, and the first conductive layer is different from the second conductive layer.

3. The method of claim 1, wherein each of the plurality of second conductive lines comprises:
   a first end and a second end, and the first end and the second end are not connected by the cut-metal pattern.

4. The method of claim 1, wherein each of the plurality of third conductive lines comprises:
   a first cut-metal pattern connected to a first end of the third conductive line; and
   a second cut-metal pattern connected to a second end of the third conductive line.

5. The method of claim 1, wherein each of the plurality of first conductive lines comprises:
   a first cut-metal pattern connected to a first end of the first conductive line; and
   a second cut-metal pattern connected to a second end of the first conductive line.

6. The method of claim 1, wherein each of the plurality of third conductive lines is shorter than each of the plurality of second conductive lines.

7. The method of claim 1, wherein a plurality of fourth conductive lines is disposed between the plurality of first conductive lines and the plurality of second conductive lines, the plurality of fourth conductive lines is assigned to a same mask layer as the plurality of second conductive lines, and the plurality of fourth conductive lines is not electrically connected to the plurality of first conductive lines and the plurality of second conductive lines.

8. The method of claim 7, wherein each of the plurality of fourth conductive lines comprises a first end and a second end, and the first end and the second end are not connected by the cut-metal pattern.

9. The method of claim 7, wherein a first continuous conductive line in the plurality of continuous conductive lines is electrically coupled to the plurality of first conductive lines and the plurality of second conductive lines, a second continuous conductive line in the plurality of continuous conductive lines is electrically coupled to the plurality of fourth conductive lines, and the first continuous conductive line is different from the second continuous conductive line.

10. The method of claim 1, wherein the plurality of first conductive lines and the plurality of second conductive lines are assigned to different mask layers.

11. The method of claim 10, wherein the plurality of second conductive lines is electrically connected to the plurality of first conductive lines via the plurality of continuous conductive lines.

12. A method of forming an integrated circuit:
   forming a conductive grid on a semiconductor substrate, wherein the conductive grid has a plurality of continuous conductive lines arranged in a first direction on a first conductive layer and a plurality of non-continuous conductive lines arranged in a second direction on a second conductive layer;

selecting a plurality of first conductive lines from the plurality of non-continuous conductive lines;

selecting a plurality of second conductive lines from the plurality of non-continuous conductive lines;

assigning the plurality of first conductive lines and the plurality of second conductive lines to different mask layers;

disposing a cut-metal pattern on the plurality of second conductive lines overlapping a first group without overlapping a second group of the second conductive lines; and removing end portions of the first group of the plurality of second conductive lines; and reassigning the first group of the plurality of second conductive lines to a same mask layer as the plurality of first conductive lines.

13. The method of claim 12, further comprising:
arranging a signal route passing through a space between the first group of the plurality of second conductive lines.

14. The method of claim 12, wherein the plurality of second conductive lines is electrically connected to the plurality of first conductive lines via the plurality of continuous conductive lines.

15. The method of claim 12, wherein a space between the plurality of first group after removal of the end portions is greater than a space between the second group of the plurality of second conductive lines.

16. The method of claim 12, wherein a space between the first group of the plurality of second conductive lines is substantially equal to a space between the plurality of first conductive lines.

17. The method of claim 12, wherein a length of the first group of the second conductive lines is substantially equal to a length of the first conductive line.

18. The method of claim 12, wherein the conductive grid further includes a plurality of via structures to electrically connect the plurality of continuous conductive lines and the plurality of non-continuous conductive lines.

19. A system, comprising:
at least one processor, configured to execute program instructions which configure the at least one processor as a processing tool that perform operations comprising:

forming, by the processing tool, a conductive grid on a semiconductor substrate, wherein the conductive grid has a plurality of continuous conductive lines arranged in a first direction on a first conductive layer and a plurality of non-continuous conductive lines arranged in a second direction on a second conductive layer;

selecting, by the processing tool, a plurality of first conductive line and a plurality of second conductive line from the plurality of non-continuous conductive lines, wherein the plurality of first conductive line and the plurality of second conductive line are assigned to different mask layers; and replacing, by the processing tool, the plurality of second conductive lines by a plurality of third conductive lines respectively when a cut-metal pattern overlaps the plurality of first conductive lines and is separated from the plurality of second conductive lines from a top view perspective, wherein the plurality of third conductive lines is assigned to a same mask layer as the plurality of the first conductive lines.

20. The system of claim 19, further comprising:
a display tool, configured to display the plurality of first conductive lines with a first color and the plurality of second conductive lines with a second color different from the first color.

* * * * *